(12) United States Patent
Kim et al.

(10) Patent No.: US 9,566,567 B2
(45) Date of Patent: *Feb. 14, 2017

(54) METAL-CARBON COMPOSITE SUPPORTED CATALYST FOR HYDROGEN PRODUCTION USING CO-EVAPORATION AND METHOD OF PREPARING THE SAME

(71) Applicant: Korea Institute of Energy Research, Daejeon (KR)

(72) Inventors: Hee Yeon Kim, Daejeon (KR); Seok Yong Hong, Daejeon (KR); Hyun Uk Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 118 days.

This patent is subject to a terminal disclaimer.

(21) Appl. No.: 14/030,070

(22) Filed: Sep. 18, 2013

(65) Prior Publication Data
US 2014/0087939 A1    Mar. 27, 2014

(30) Foreign Application Priority Data
Sep. 24, 2012 (KR) .................. 10-2012-0105762

(51) Int. Cl.
*B01J 23/42* (2006.01)
*B01J 37/02* (2006.01)
(Continued)

(52) U.S. Cl.
CPC ............ *B01J 23/42* (2013.01); *B01J 21/04* (2013.01); *B01J 23/28* (2013.01); *B01J 23/44* (2013.01);
(Continued)

(58) Field of Classification Search
CPC .......... B01J 23/28; B01J 23/44; B01J 23/462; B01J 23/52; B01J 23/75; B01J 23/755; B01J 37/0244; B01J 37/12; C01B 3/40
See application file for complete search history.

(56) References Cited

U.S. PATENT DOCUMENTS 7,396,563 B2 *  7/2008  Scarlete et al. ............ 427/248.1
7,648,942 B2    1/2010  Thollon et al.
(Continued)

FOREIGN PATENT DOCUMENTS

JP    2002-263496 A    9/2002
JP    2005-034835 A    2/2005
(Continued)

OTHER PUBLICATIONS

Bitter et al.: "Deactivation and Coke Accumulation during CO2/CH4 Reforming over Pt Catalysts", Journal of Catalysis, 1999, vol. 183, pp. 336-343.
(Continued)

*Primary Examiner* — Jun Li
(74) *Attorney, Agent, or Firm* — Westman, Champlin & Koehler, P.A.; Amanda M. Prose

(57) ABSTRACT

A metal-carbon composite supported catalyst for hydrogen production using co-evaporation and a method of preparing the same, wherein the catalyst is configured such that a metal-carbon composite having a core-shell structure resulting from co-evaporation is supported on the surface of an oxide-based support coated with carbon, thereby maintaining superior durability without agglomeration even in a catalytic reaction at a high temperature. Because part or all of the surface of metal is covered with the carbon shell, even when the catalyst is applied under severe reaction conditions including high temperatures, long periods of time, acidic or alkaline states, etc., the metal particles do not agglomerate or are not detached, and do not corrode, thus exhibiting high performance and high durability. Therefore, inactivation of
(Continued)

the catalyst or the generation of side reactions can be prevented, so that the catalyst can be efficiently utilized in hydrogen production.

11 Claims, 5 Drawing Sheets

(51) Int. Cl.

| | |
|---|---|
| *B01J 37/08* | (2006.01) |
| *B01J 37/12* | (2006.01) |
| *B01J 21/04* | (2006.01) |
| *B01J 23/28* | (2006.01) |
| *B01J 23/44* | (2006.01) |
| *B01J 23/46* | (2006.01) |
| *B01J 23/52* | (2006.01) |
| *B01J 23/75* | (2006.01) |
| *B01J 23/755* | (2006.01) |
| *B01J 29/04* | (2006.01) |
| *B01J 29/068* | (2006.01) |
| *B01J 29/072* | (2006.01) |
| *B01J 29/076* | (2006.01) |
| *B01J 35/00* | (2006.01) |
| *C01B 3/40* | (2006.01) |

(52) U.S. Cl.
CPC ............ *B01J 23/462* (2013.01); *B01J 23/52* (2013.01); *B01J 23/75* (2013.01); *B01J 23/755* (2013.01); *B01J 29/043* (2013.01); *B01J 29/044* (2013.01); *B01J 29/045* (2013.01); *B01J 29/068* (2013.01); *B01J 29/072* (2013.01); *B01J 29/076* (2013.01); *B01J 35/002* (2013.01); *B01J 35/008* (2013.01); *B01J 37/0217* (2013.01); *B01J 37/0244* (2013.01); *B01J 37/084* (2013.01); *B01J 37/12* (2013.01); *C01B 3/40* (2013.01); *C01B 2203/0238* (2013.01); *C01B 2203/107* (2013.01); *C01B 2203/1047* (2013.01); *C01B 2203/1082* (2013.01); *C01B 2203/1241* (2013.01); *Y02P 20/142* (2015.11)

(56) References Cited

U.S. PATENT DOCUMENTS

| | | | | |
|---|---|---|---|---|
| 9,175,385 | B2 * | 11/2015 | Kim | ................... C23C 16/30 |
| 2006/0193978 | A1 * | 8/2006 | Toth | ...................... 427/212 |
| 2009/0004552 | A1 * | 1/2009 | Sun | ................... H01M 4/92 |
| | | | | 429/409 |
| 2009/0297709 | A1 | 12/2009 | Zaitsev et al. | |
| 2010/0221427 | A1 * | 9/2010 | Fry | ................... 427/255.28 |
| 2012/0021331 | A1 * | 1/2012 | Zhu | ..................... H01B 1/04 |
| | | | | 429/483 |
| 2012/0068156 | A1 * | 3/2012 | Koley | ........................ 257/14 |
| 2013/0287948 | A1 | 10/2013 | Kim et al. | |

FOREIGN PATENT DOCUMENTS

| | | |
|---|---|---|
| JP | 2008525635 A | 7/2008 |
| JP | 2011-175772 A | 9/2011 |
| JP | 2012-067379 A | 4/2012 |
| KR | 10-0980590 B | 9/2010 |
| KR | 102011013994 A | 12/2011 |

OTHER PUBLICATIONS

Maity et al.: "Carbon Modified Y Zeolite used as Support Material for Hydroprocessing Catalysts", Catalysts Today, 2010, vol. 150, pp. 231-236.

Suzuki et al.: "CO2 Reforming of Methane by Thermal Diffusion Column Reactor with Ni/Carbon-Coated Alumina Tube Pyrogen", Energy & Fuels, 2001, vol. 15, pp. 571-57.

* cited by examiner

METAL-CARBON COMPOSITE SUPPORTED CATALYST FOR HYDROGEN PRODUCTION USING CO-EVAPORATION AND METHOD OF PREPARING THE SAME

CROSS-REFERENCE TO RELATED APPLICATION(S)

This application claims priority to Korean Patent Application No. 10-2012-0105762, filed on Sep. 24, 2012, the disclosure of which is incorporated by reference in its entirety.

BACKGROUND OF THE INVENTION

1. Field of the Invention

The present invention relates to a metal-carbon composite supported catalyst for hydrogen production using co-evaporation and a method of preparing the same, and, more particularly, to a method of preparing a metal-carbon composite supported catalyst for hydrogen production and a metal-carbon composite supported catalyst prepared thereby, wherein the catalyst is configured such that a metal-carbon composite having a core-shell structure resulting from co-evaporation is supported on the surface of an oxide-based support coated with carbon, thereby maintaining superior durability without agglomeration even in a catalytic reaction at a high temperature.

2. Description of the Related Art

With the increasing demand for hydrogen as clean energy these days, a catalyst for hydrogen production, which is regarded as very important in terms of commercializing hydrogen as an energy source, is receiving great attention.

A catalyst is a material which controls the reaction rate and plays an important role in chemical processes, including hydrogen production, etc. Among catalyst materials for use in most chemical processes including hydrogen production, etc., noble metal catalysts such as platinum, gold, palladium, rhodium, etc. exhibit superior performance compared to other metal catalysts, but they are very expensive, which is undesirable. Also, the use of noble metal catalysts is limited because they are easily inactivated during the catalytic reaction. Such noble metal catalysts are mostly provided in the form of a heterogeneous catalyst using a support in order to increase the reactive surface area thereof, but may easily agglomerate during the reaction or may be frequently lost due to corrosion or the like during the reaction. Accordingly, thorough research into overcoming such problems is ongoing.

Korean Patent No. 10-0980590 discloses a nickel catalyst supported on a porous yttria stabilized zirconia support, a method of preparing the same and a method of producing hydrogen via autothermal reforming of ethanol using the catalyst. This patent, in which nickel is supported on a zirconia support prepared by hydrothermal polymerization following hydration and condensation using a sol-gel process, is different from the present invention which provides a metal-carbon composite supported catalyst for hydrogen production with high performance and high durability using a simple process such as co-evaporation.

Also, Korean Patent Application Publication No. 10-2011-0139994 discloses a technique for preparing a lithium manganese oxide-carbon nano composite via mixing of ionic solutions. In order to synthesize the composite as in the above patent, multiple steps, including solution reaction, crystal growth, treatment with a strong acid or strong base to remove a template component, heat treatment for alloying, etc., should be performed, which is undesirable.

CITATION LIST

Korean Patent No. 10-0980590, Korean Patent Application Publication No. 10-2011-0139994

SUMMARY OF THE INVENTION

Accordingly, the present invention has been made keeping in mind the above problems encountered in the related art, and an object of the present invention is to provide a method of preparing a metal-carbon composite supported catalyst for hydrogen production and a metal-carbon composite supported catalyst for hydrogen production prepared thereby, wherein not only a co-evaporation process which causes no process variables for scale-up and is thus suitable for use in mass production and is simpler than conventional techniques, but also a process of coating the surface of an oxide-based support with carbon are adopted, thus maximizing the supporting efficiency of the metal-carbon composite on the oxide-based support, and even when the catalyst is applied under severe reaction conditions including high temperatures, long periods of time, acidic or alkaline states, etc., metal particles do not agglomerate or are not detached, and do not corrode, thus exhibiting high performance and high durability of the catalyst.

In order to accomplish the above object, the present invention provides a method of preparing a metal-carbon composite supported catalyst for hydrogen production, comprising (S1) coating the surface of an oxide-based support with carbon to form a carbon layer, and then positioning the support in a reactor; (S2) vaporizing a metal precursor and an organic precursor for forming a carbon shell in respective vaporizers; (S3) feeding the vaporized metal and organic precursors into the reactor having the support positioned therein by means of a carrier gas while preventing the precursors from coming into contact with each other; and (S4) heating the reactor and then maintaining the temperature of the reactor at a predetermined level, thus synthesizing a metal-carbon composite supported on the oxide-based support.

In addition, the present invention provides a metal-carbon composite supported catalyst for hydrogen production, configured such that a metal-carbon composite having a core-shell structure is supported on an oxide-based support whose surface is coated with a carbon layer, wherein the metal-carbon composite having the core-shell structure includes a metal as a core and carbon as a shell and part or all of the core is covered with the shell.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
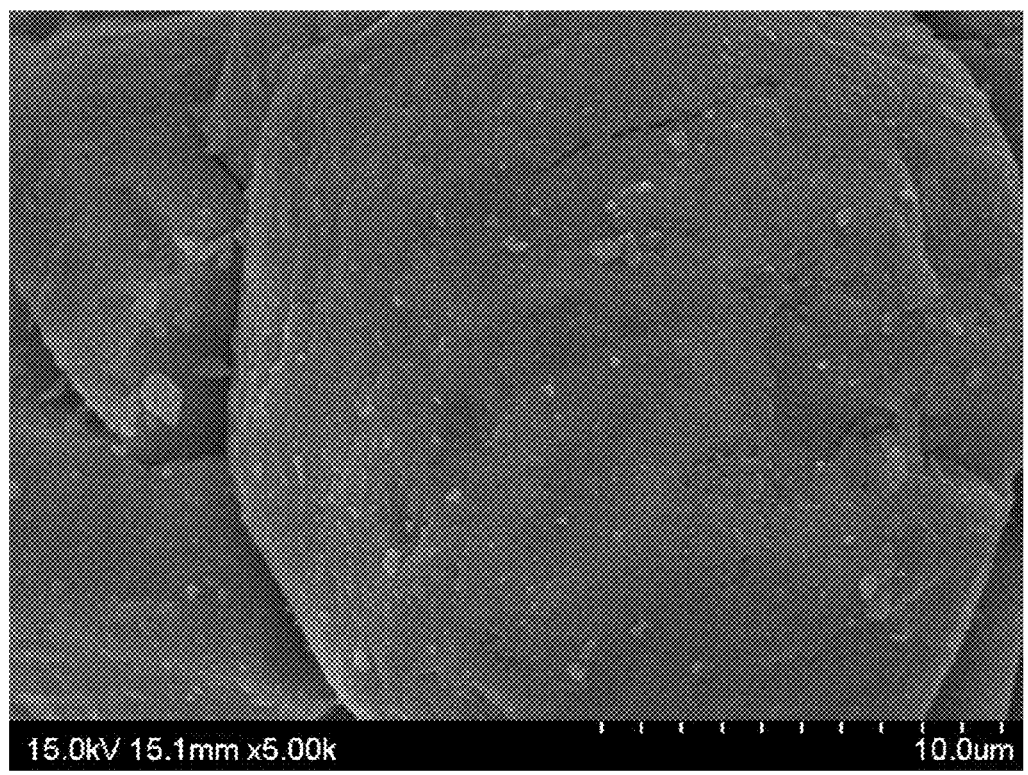
FIG. 1 illustrates a scanning electron microscope (SEM) image of the surface of alumina covered with a carbon layer.

Hereinafter, a detailed description will be given of the present invention.

According to an aspect of the present invention, a method of preparing a metal-carbon composite supported catalyst for hydrogen production includes (S1) coating the surface of an oxide-based support with carbon to form a carbon layer, and then positioning the support in a reactor; (S2) vaporizing a metal precursor and an organic precursor for forming a carbon shell in respective vaporizers; (S3) feeding the vaporized metal and organic precursors into the reactor containing the support by means of a carrier gas while preventing the precursors from coming into contact with each together; and (S4) heating the reactor and then maintaining the temperature of the reactor at a predetermined level, thus synthesizing a metal-carbon composite supported on the oxide-based support.

The oxide-based support is used to support the metal-carbon composite and is prepared by being dried in an oven at 110° C. for 12 hr or more. The oxide-based support may include one or more selected from the group consisting of alumina, silica, titania, zirconia, zeolite and MCM-41, and the oxide-based support may be porous.

In order to maximize the supporting efficiency of a metal-carbon composite which is typically difficult to support on the surface of an oxide-based support, an embodiment of the present invention includes coating the surface of the oxide-based support with carbon to form the carbon layer. The carbon coating may include one or more organic precursors selected from the group consisting of methane, acetylene, methanol, ethanol, acetone, benzene, toluene and xylene. The coating of the surface of the oxide-based support with carbon to form the carbon layer may be carried out by increasing the temperature of the vaporizer containing the organic precursor up to a predetermined level. The temperature of the vaporizer may vary depending on the kind of selected precursor. For example, in the case of ethanol, the temperature of the vaporizer is preferably set to about 75° C. As such, the temperature of the reactor containing the oxide-based support may be increased to the range of 400~1000° C., and preferably 600~700° C. If the temperature of the reactor is less than 400° C., the core-shell structure (the metal-carbon composite) is not synthesized. In contrast, if the temperature thereof is higher than 1000° C., such a structure may be synthesized, but the reactor should be made of an alumina tube, instead of quartz. When the temperature of the vaporizer reaches a final temperature and the temperature of the reactor arrives at 400~1000° C., the coke of the vaporizer is opened and simultaneously nitrogen gas (30 sccm) is allowed to flow into the vaporizer, whereby the vaporized organic precursor is allowed to flow into the reactor containing the oxide-based support. Furthermore, this state is maintained for 10 min~6 hr, so that the carbon layer may be formed on the surface of the oxide-based support. As such, if the flow time of the organic precursor is less than 10 min, the formation of the carbon layer becomes very insignificant. The carbon layer becomes thicker over time. The flow time of the organic precursor of about 1 hr or more results in almost all of the surface of the support being covered with the carbon layer. In the case where there is a need to increase the thickness of the carbon layer, the flow time of the organic precursor may be maintained to be longer than 1 hr. The properties of the carbon layer may be controlled by changing the kind of organic precursor and the process temperature, and the carbon layer may be formed to be porous.

Furthermore, the use of a support having a large surface area is preferable because it may maximize the supporting effect. The metal-carbon composite supported on the support may be generally applied to a variety of catalytic reactions, including a reforming reaction, a pyrolytic reaction, hydrogenation/dehydrogenation, etc.

In an embodiment of the present invention, Step (S1) may further include subjecting the surface of the oxide-based support to N-doping or ozone treatment after coating it with carbon.

Although the metal-carbon composite is typically well supported on the oxide-based support coated with carbon, additional surface treatment of the oxide-based support using N-doping or ozone may be carried out in order to further increase the extent of dispersion of the composite.

For N-doping, a support is positioned in a quartz tube, and while ammonia gas is allowed to flow at a flow rate of about 50 sccm at normal pressure, the temperature of the quartz tube is increased up to 300~900° C. and doping treatment may be performed at the increased temperature for 10 min~3 hr. If the treatment is performed out of the above ranges, the supporting efficiency may deteriorate. As such, in the case where the amount of the sample to be treated is increased, it is natural that the inner diameter of the quartz tube is increased and the flow rate of ammonia gas is also proportionally increased.

For ozone treatment, oxygen gas is connected to an ozone generator (Lab-1), and the generator is purged with oxygen for initial 5~30 min. Subsequently, ozone is generated in an amount of 5~150 g/m$^3$ and the generated ozone is allowed to flow into the reactor containing the support sample. As such, the reactor is coupled with a heating mantle, so that the temperature thereof is uniformly maintained at 25~300° C., and all the processes are performed in a fume hood. Ozone treatment is performed at a predetermined temperature for a predetermined period of time, and finally oxygen purging is conducted for 5~30 min, and the sample (support) is recovered. As the ozone treatment time is longer and the treatment temperature is higher, the extent of substitution of an oxide group depending on the ozone treatment may increase.

Upon vaporizing the metal precursor and the organic precursor for forming a carbon shell in respective vaporizers in Step (S2), the metal precursor is fed into one vaporizer and the organic precursor for forming a carbon shell is fed into another vaporizer, after which the temperatures of the vaporizers are increased to approximate boiling points of respective precursors, so that the metal precursor and the organic precursor may be simultaneously vaporized. That is, a co-evaporation process may be utilized. In the case where an organic precursor in a gas phase is used, the corresponding precursor may be placed unchanged into the vaporizer without additional vaporization. The case where a co-evaporation process is adopted is advantageous because the metal-carbon composite may be prepared via simultaneous vaporization of the metal and carbon precursors, and is thus simpler compared to when using a conventionally useful template process, and facilitates the control of properties of a product and the formation of nano-sized particles. A conventional template process is very complicated, and involves melting the template with a reagent such as a strong acid, a strong alkali, etc. harmful to humans. However, in the case of the metal-carbon composite according to the present invention, two or more components in a gas phase are simultaneously synthesized, thus achieving a simpler process, and a smaller nano-sized composite may be effectively mass produced.

The metal precursor used in this step is a precursor of a metal which constitutes the core of a final metal-carbon composite, and may include any material which may be vaporized. Preferably useful is any one selected from the group consisting of a platinum precursor, a palladium precursor, a ruthenium precursor, a nickel precursor, a cobalt precursor, a molybdenum precursor and a gold precursor. More preferably, the platinum (Pt) precursor may be selected from the group consisting of (trimethyl)methylcyclopentadienyl platinum, platinum(II) acetylacetonate, tetrakis(trifluorophosphine)platinum(0), tetrakis(triphenylphosphine)platinum(0), platinum(II) hexafluoroacetylacetonate, trimethyl(methylcyclopentadienyl) platinum(IV) and (1,5-cyclooctadiene)dimethylplatinum(II). The palladium (Pd) precursor may include palladium(II) acetate, hexafluoroacetylacetonate palladium(II) or palladium(II) acetylacetonate, and the ruthenium (Ru) precursor may include ruthenium acetylacetonate, bis(ethylcyclopentadienyl)ruthenium (II), bis(cyclopentadienyl)ruthenium(II) or tris(2,2,6,6-tetramethyl-3,5-heptadionate)ruthenium(III). The nickel (Ni) precursor may include nickel(II) acetylacetonate, bis-cyclopentadienyl nickel or tetrakis trifluorophosphine nickel, and the cobalt (Co) precursor may include cobalt(II) acetylacetonate, dicarbonylcyclopentadienyl cobalt, cobalt carbonyl or cyclopentadienyl dicarbonyl-cobalt(I), and the molybdenum (Mo) precursor may include molybdenum hexacarbonyl or molybdenum (V) chloride, and the gold (Au) precursor may include methyl(triphenylphosphine) gold(I). As such, because gaseous conditions and vaporization temperature may vary depending on the type of precursor, they should be appropriately adjusted.

The organic precursor used in this step is a precursor of carbon which constitutes the shell of a final heterogeneous composite, and may include a precursor such as any hydrocarbon including carbon. Preferably useful are one or more selected from among liquid precursors including methanol, ethanol, acetone, benzene, toluene and xylene, and gas precursors including methane or acetylene.

The vaporizers used in this step may be those which are known or are directly manufactured. Typically useful are vaporizers made of metal or glassware (quartz glass or Pyrex). The use of glassware is preferable because the properties of the contents and the remaining amount thereof may be checked while the temperature of the reactor is maintained uniform and also because it is a stable material which does not react with the precursor.

The specific vaporization conditions of the precursors in this step depend on the kind of selected precursor. In one embodiment of the present invention, when (trimethyl)methylcyclopentadienyl platinum is used as the platinum precursor, vaporization may be conducted at a temperature of 50~70° C., and when acetone is used as the organic precursor, vaporization may be conducted at a temperature of 50~60° C. In another embodiment of the present invention, when (1,5-cyclooctadiene)dimethylplatinum(II) is used as the platinum precursor, it is dissolved in a solvent such as benzene and then vaporized at a high temperature of about 100° C. or more. Alternatively, a quantitative pump may be connected to a reactor containing the dissolved platinum precursor, and a connection pipe provided between the quantitative pump and the reactor may be heated, thereby vaporizing the precursor. In respective cases, nitrogen gas (its flow rate is adjusted depending on the volume of the quartz tube) is allowed to flow, and thereby the vaporized precursor is allowed to flow toward the quartz tube positioned in a furnace, that is, toward the reactor for synthesizing the metal-carbon composite.

Subsequently, the metal precursor and the organic precursor, which are vaporized in Step (S2), are fed into the reactor by means of a carrier gas while preventing them from coming into contact with each other (Step (S3)). As such, these precursors are transferred into the reactor containing the support via the shortest distance.

In this step, the precursors in a gas phase are fed into the reactor via separate supply lines so as not to come into contact with each other by means of the carrier gas. Specifically, the precursors vaporized in an oven at a predetermined temperature are transferred to the reactor via a gas transfer path wound with a heating line to prevent condensation or flocculation thereof. The temperature of the heating line is preferably maintained near the boiling points of the precursors. The vaporized precursors come into contact with each other at the inlet of the reactor where a final reaction occurs. If the precursors come into contact with each other in the transfer path, undesired side-reactions may take place or the wall of the transfer path may be coated therewith, which is unfavorable.

The carrier gas used in this step may include nitrogen, argon, helium, oxygen or hydrogen in order to prevent condensation of the precursors or generation of side reactions. Mainly useful is an inert gas such as nitrogen, argon, helium, etc., but oxygen or hydrogen may be used depending on the type of precursor.

According to the present invention, the precursors in a gas phase fed in Step (S3) are supported on the surface of the oxide-based support while being mixed in the reactor at a predetermined temperature to form a composite (Step (S4)).

In this step, the reaction conditions for synthesizing the metal-carbon composite and supporting it on the surface of the oxide-based support are dependent on the kinds of precursors, that is, the kinds of metal and organic precursors, and the synthesis reaction is efficiently carried out at about 300° C. or more, and preferably 300~1800° C., and the synthesis temperature may be selected by the appropriate design of heating furnace and reactor. For example, in the case where a quartz glass reactor is used, the reaction temperature is preferably set to 300~1100° C., and in the case where an alumina tube or a graphite reactor is used, the reaction temperature may be set to 1800° C., and the temperature of 1800° C. or more may also be applied by the appropriate design of heating furnace and reactor. As the synthesis temperature is raised, defects in the shell around the metal particles may decrease, and crystallinity may increase. The synthesis time is set to 5 min or more, and preferably about 1 hr. As the synthesis time is lengthened, the amount of synthesized metal-carbon composite and the amount of supported composite on the oxide-based support may increase. Also, the flow rate ratio of the precursors to be fed into the reactor is adjusted, thereby controlling the properties of the final composite. For example, the thickness of the carbon shell and the number of graphite layers may decrease when the flow rate ratio of the metal precursor and the organic precursor is maintained at 2:1 compared to when the ratio thereof is 1:1. Accordingly, it is possible to synthesize various metal-carbon composites at different flow rate ratios depending on the applied catalytic reaction.

Figure 5:
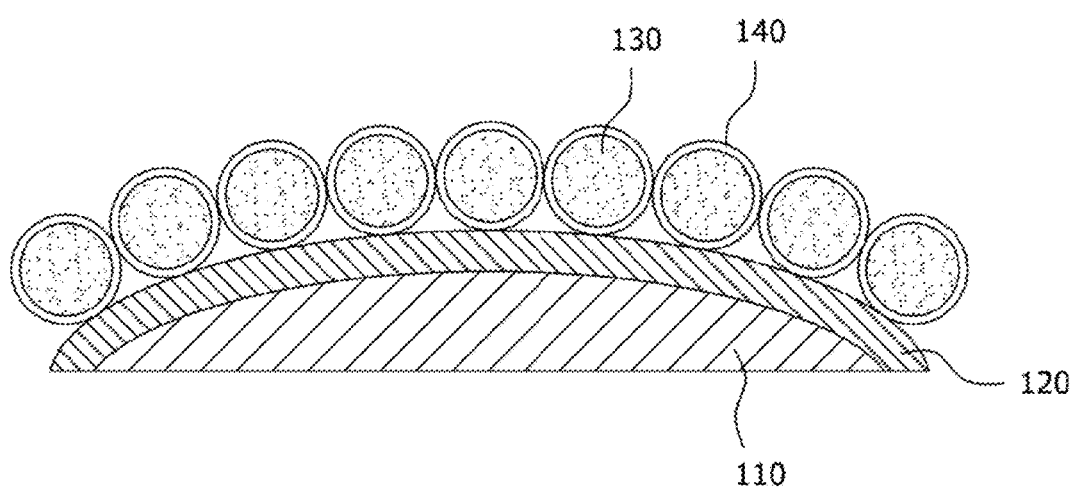
FIG. 5 illustrates a metal-carbon composite (a core-shell structure) supported catalyst according to an embodiment of the present invention.

In addition, the present invention addresses a metal-carbon composite supported catalyst for hydrogen production, which is configured such that a metal-carbon composite having a core-shell structure is supported on an oxide-based support having a carbon layer coated with carbon, and the metal-carbon composite having the core-shell structure includes a metal as a core and carbon as a shell and part or all of the core is covered with the shell, that is, the carbon layer has a defect on a part thereof or has no defect (FIG. 5). The composite is a metal-carbon composite having a core-shell structure wherein part or all of the core is covered with the shell. The supported catalyst is configured such that the surface of the oxide-based support is coated with carbon to form the carbon layer, thus exhibiting very superior supporting efficiency of the metal-carbon composite. In the case of a typical catalytic reaction in a molecular unit in a gas phase, the structure in which part of the core is covered with a shell having a defect is favorable. The composite according to the present invention is favorable in terms of recovering the catalyst after the composite in the form of being supported on the support has been used for a catalytic reaction. Moreover, because the composite of the invention is provided in the form of being supported, it is particularly useful in catalytic reactions using conventional monolithic, honeycombed or microchannel type reactors, membrane reactors, packed bed reactors, etc., and also it is supported on a conventional adsorbent and may thus be applied to a variety of adsorption/desorption processes. Furthermore, the metal-carbon composite supported on the support according to the present invention may be generally applied to various catalytic reactions, including a reforming reaction, a pyrolytic reaction, hydrogenation/dehydrogenation, etc. The composite according to the present invention is configured such that part or all of the surface of the metal core is covered with the carbon shell, and thus, even when it is applied under severe reaction conditions including high temperatures, long periods of time, acidic or alkaline states, etc., the metal particles do not agglomerate or are not detached, and do not corrode, thus ensuring high performance and high durability. Unlike a typical catalyst whose reaction activity decreases depending on the lapse of reaction time upon hydrogen production, the metal-carbon composite supported catalyst according to the embodiment of the present invention causes little change in reaction activity depending on the lapse of reaction time, and thereby may be effectively utilized in hydrogen production without inactivating the catalyst or generating side reactions.

A better understanding of the present invention may be obtained via the following examples which are set forth to illustrate, but are not to be construed as limiting the present invention.

Example 1

Synthesis of Platinum-Carbon Core-Shell Structure Supported Alumina Powder (Platinum-Carbon Composite Supported Catalyst)

A 7-alumina (surface area 155 m$^2$/g, ~150 mesh, 58 Å) support was used. For use as the support, 0.2 g of a sample (alumina) dried in an oven at 110° C. for 12 hr (overnight) was placed in a quartz tube (½ inch) equipped with a quartz filter. As such, the inside of two vaporizers provided in the oven was maintained in a nitrogen atmosphere and cokes for inflow and outflow were closed, and nitrogen was allowed to flow for 30 min or more via a bypass line without passing through the vaporizers, thereby removing impurities from the inside of the reactor.

Subsequently, in order to cover the surface of alumina with a carbon layer, the vaporizer containing ethanol was heated up to 75° C., and the reactor containing alumina powder was heated up to 600° C. When the vaporizer reached the final temperature, that is, 75° C. and the reactor reached 600° C., the coke of the vaporizer was opened and simultaneously nitrogen gas (30 sccm) was allowed to flow into the vaporizer, whereby ethanol in a gas phase was allowed to flow into the reactor containing alumina. This state was maintained for 1 hr, thus forming the carbon layer on the surface of alumina.

Subsequently, in order to achieve effective dispersion and supporting of a platinum-carbon heterogeneous composite on the surface of alumina, the surface of alumina covered with the carbon layer was subjected to ozone treatment. To this end, oxygen gas was connected to an ozone generator (Lab-1) and the generator was purged with oxygen for initial 30 min. Then, ozone was generated in an amount of 50 g/m$^3$ and then allowed to flow into the reactor containing the support sample. As such, the reactor was coupled with a heating mantle and thus the temperature thereof was uniformly maintained at 160° C., and all the processes were performed in a fume hood. Finally, oxygen purging was performed for 30 min, and the sample (support) was recovered.

As a platinum precursor, methylcyclopentadienyl platinum (MeCpPtMe3) was used, and ethanol (≥99.9%) was used as a carbon precursor. The temperature of a vaporizer for vaporizing the platinum precursor was increased to 60° C., and the temperature of a vaporizer for vaporizing ethanol was increased to 75° C. As such, a temperature controller was programmed in such a manner that the heating rates were set so that the points of time at which respective precursors reached final temperatures were the same as each other. Also, the reactor containing the alumina powder was heated to 600° C., and the point of time at which alumina reached 600° C. was the same as the points of time at which two precursors reached the final temperatures.

When two precursors and the reactor containing the alumina powder reached the final temperatures, the cokes of the vaporizers were opened and nitrogen gas (each 30 sccm) as a carrier gas was fed into the reactor together with the vaporized precursors. The reaction was initiated as soon as the cokes of the vaporizers were opened, from which the reaction time was then maintained for 30 min or more, thereby synthesizing a platinum-carbon heterogeneous composite supported on the surface of alumina (a platinum-carbon composite supported catalyst).

Test Example 1

Figure 2:
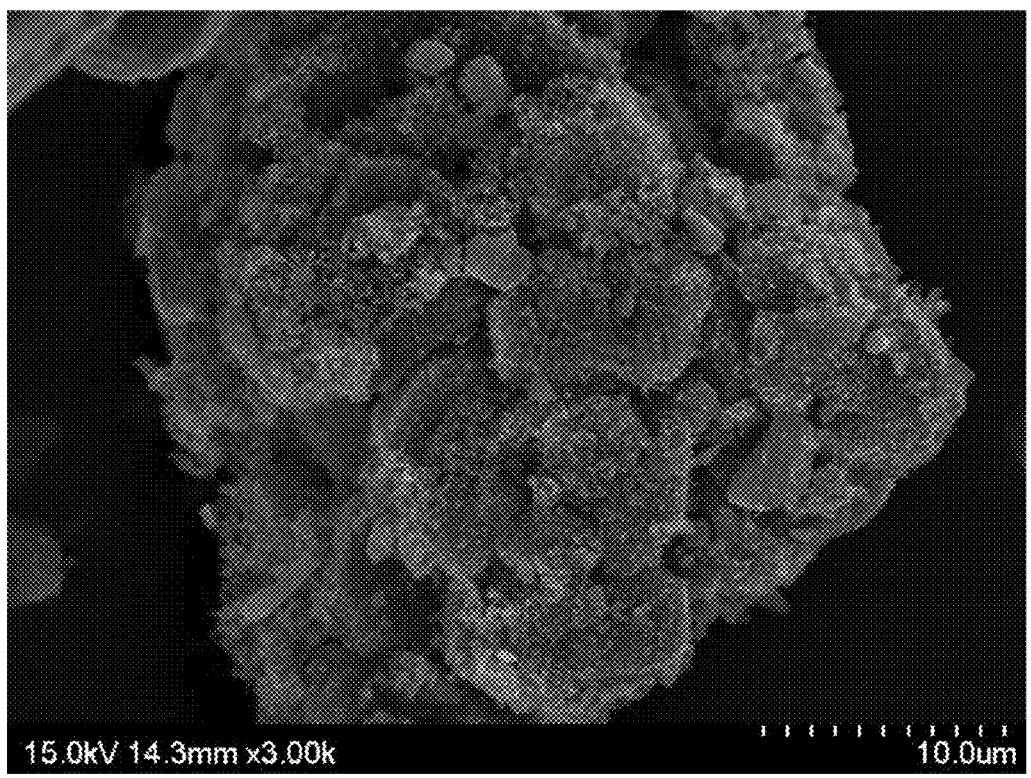
FIG. 2 illustrates a SEM image of a platinum-carbon composite (a core-shell structure) supported on the surface of alumina covered with the carbon layer.

SEM Analysis of Synthesized Platinum-Carbon Composite Supported Catalyst Comprising Platinum-Carbon Core-Shell Structure Supported on the Surface of Alumina In the course of synthesis of the platinum-carbon composite supported catalyst comprising the platinum-carbon core-shell structure supported on alumina in Example 1, the surface of the sample was observed using SEM. The results are shown in FIGS. 1 and 2. FIG. 1 shows the surface of alumina covered with the carbon layer, wherein the carbon layer is formed on almost all of the surface of alumina. FIG. 2 shows the platinum-carbon composite (the core-shell structure) supported on the surface of alumina covered with the carbon layer, wherein the platinum-carbon composite (the core-shell structure) is uniformly applied on the surface of alumina.

Test Example 2

Figure 3:
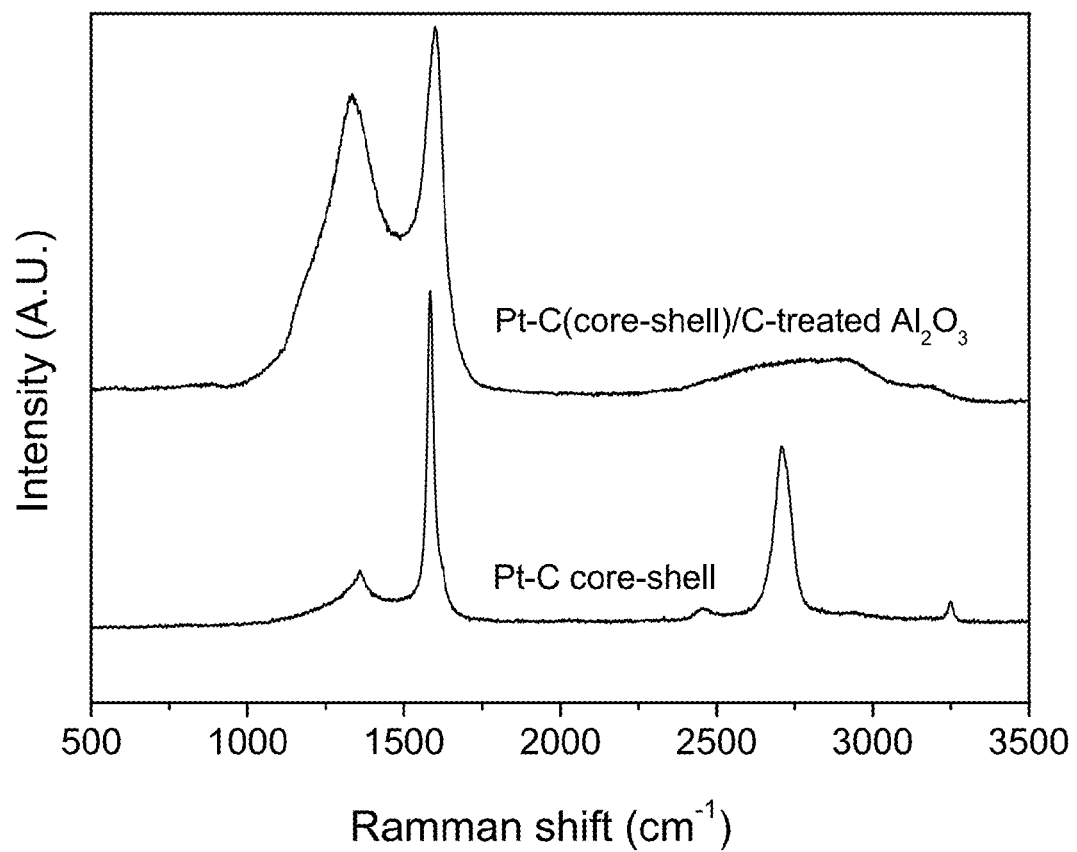
FIG. 3 illustrates results of Raman analysis of the platinum-carbon composite (the core-shell structure) supported on the surface of alumina.

Raman Analysis of Platinum-Carbon Composite (Core-Shell Structure) Supported on the Surface of Alumina In order to evaluate the properties of carbon of the platinum-carbon composite (the core-shell structure) supported on the surface of alumina synthesized in Example 1, Raman analysis was performed. The results are shown in FIG. 3. The upper portion of the Raman graph illustrates results of the platinum-carbon composite (the core-shell structure) catalyst supported on alumina, wherein the magnitude of G (graphitic carbon) peak at 1580 $cm^{-1}$ is greater than that of D (disordered carbon) peak at 1350 $cm^{-1}$. However, because the presence of alumina used as the support has a great influence on the Raman results, it is difficult to accurately evaluate the properties of the carbon shell. Thus, the platinum-carbon core-shell supported on the surface of alumina was selectively collected and subjected to Raman analysis. These results are illustrated in the lower portion of the graph. As seen in the results, the magnitude of G peak is greater by about 7 times than that of D peak, from which the carbon shell of the platinum-carbon composite (the core-shell structure) is confirmed to have a graphene structure with very superior crystallinity. Also, D peak is considered to be due to the defect of the carbon shell, and such a defect is used as the transfer path of gas molecules in a gaseous catalytic reaction.

Test Example 3

Figure 4:
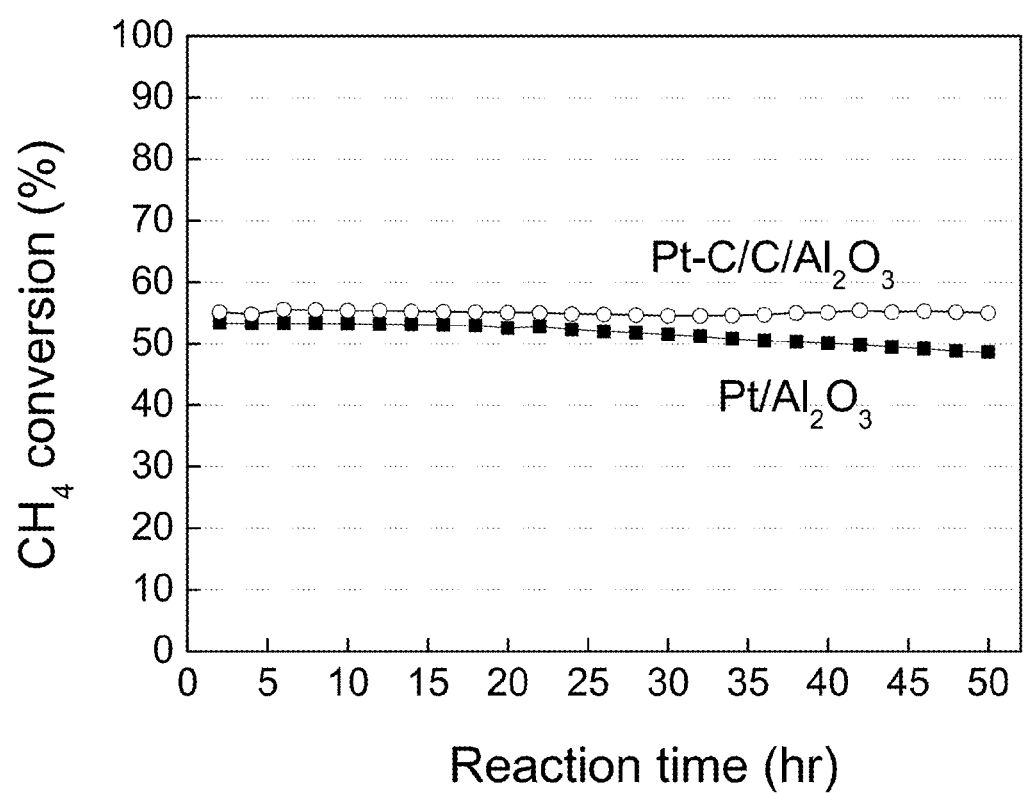
FIG. 4 illustrates results of testing of performance of a carbon dioxide reforming reaction of methane using the platinum-carbon composite (the core-shell structure) supported on the surface of alumina.

Evaluation of Performance of Carbon Dioxide Reforming Reaction (Hydrogen Production) of Methane Using the Platinum-Metal Composite Supported Catalyst Comprising Platinum-Carbon Core-Shell Structure Supported on the Surface of Alumina In order to evaluate the catalytic reaction activity of the platinum-carbon composite (the core-shell structure) (Pt 1 wt %) supported on the surface of alumina synthesized in Example 1, a carbon dioxide reforming reaction of methane was performed and the performance of the catalyst used was compared with that of a typical impregnated catalyst (Pt(1.8 wt %)/$Al_2O_3$) prepared using initial impregnation (FIG. 4).

0.2 g of each of the supported catalyst of Example 1 and the impregnated catalyst was placed in a reactor, heated to 700° C., burned for 6 hr in an air atmosphere, and then reduced in a hydrogen atmosphere for 2 hr. Thereafter, while the flow rate ratio of methane and carbon dioxide was maintained at 1:1 at the same temperature, each was placed in the reactor at a rate of 30 ml/min. The reaction was carried out for 50 hr using respective catalysts, and initial methane conversion results were similar to each other (the platinum-carbon composite (the core-shell structure) catalyst: 55%, the Pt impregnated catalyst: 53%). The size of platinum particles of the platinum-carbon composite (the core-shell structure) catalyst is about 2~3 nm, which is smaller than that of the conventional impregnated catalyst (a particle size of about 5 nm). Thus, in the case where the same Pt mass ratio is applied, the number of catalytic active sites is higher in the core-shell catalyst than in the impregnated catalyst but the catalytic activity results depending on the Pt mass ratio (wt %) are similar in the inventive catalyst and the conventional impregnated catalyst. This is because, in the case of the core-shell catalyst, the surface of the platinum particles is covered with graphene and thus the entire surface of the platinum particles does not function as the catalytic active site. In order to determine the Pt mass ratio (wt %) of the platinum-carbon composite (the core-shell structure) supported on the surface of alumina, a pretreatment process was applied to perform ICP-OES (Inductively Coupled Plasma-Optical Emission Spectrometer) mainly useful in quantitative analysis of metal. The platinum-carbon composite supported catalyst (the platinum-carbon core-shell catalyst supported on alumina) of Example 1 was placed in a quartz tube, and then treated at 600° C. at normal pressure for 2 hr while allowing oxygen gas (20 wt %/$N_2$ balance) to flow, so that ICP-OES analysis was conducted.

On the other hand, the slope of the reaction activity of the impregnated catalyst can be seen to more sharply decrease depending on the lapse of reaction time. Whereas, the platinum-carbon composite supported catalyst causes little change in reaction activity depending on the lapse of reaction time, and exhibits uniform activity. This is considered to be because inactivation of the catalyst or generation of side reactions is prevented by virtue of the graphene layer applied on the platinum catalyst (FIG. 4).

As described hereinbefore, the present invention provides a metal-carbon composite supported catalyst for hydrogen production using co-evaporation and a method of preparing the same. According to the present invention, metal and carbon precursors can be simultaneously vaporized using co-evaporation, thus synthesizing a core-shell type composite, which has various properties depending on changes in temperature and composition. Also, the surface of an oxide-based support is coated with carbon and thus the composite can be easily supported even on the surface of the support which is not made of carbon. Moreover, the surface of the support coated with carbon is subjected to N-dopping or ozone treatment, thus further improving the extent of dispersion of the composite to thereby increase supporting efficiency.

According to the present invention, because part or all of the surface of metal is covered with the carbon shell, even when the catalyst is applied under severe reaction conditions including high temperatures, long periods of time, acidic or alkaline states, etc., the metal particles do not agglomerate or are not detached, and do not corrode, thus exhibiting high performance and high durability. Therefore, inactivation of the catalyst or the generation of side reactions can be prevented, so that the catalyst can be efficiently utilized in hydrogen production.

According to the present invention, the metal-carbon composite having a core-shell structure can be very effectively utilized in general catalytic processes or as electrode materials in a variety of fields because it can be supported even on the surface of the oxide-based support, such as alumina, silica, titania, etc. Also, the metal-carbon composite having a core-shell structure can be easily supported via the same procedure even in channels of various reactors, including monolithic, honeycombed or microchannel type reactors, thus making it very easy to apply the catalyst to diverse processes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a metal-carbon composite supported catalyst for hydrogen production, comprising:
   (S1) coating a surface of an oxide-based support with carbon to form a carbon layer, and then positioning the support in a reactor;
   (S2) providing a metal precursor for forming a metal core and an organic precursor for forming a carbon shell to respective vaporizers, in order to be supplied to the reactor in a vaporized state wherein the metal precursor comprises one or more selected from the group consisting of a platinum precursor, a palladium precursor, a ruthenium precursor, a nickel precursor, a cobalt precursor, a molybdenum precursor and a gold precursor;
   (S3) feeding the metal precursor and the organic precursor, which are vaporized, into the reactor containing the oxide-based support having a carbon layer by means of a carrier gas while preventing the precursors from coming into contact with each other prior to introducing each of the vaporized precursors to the reactor; and
   (S4) heating the reactor and then maintaining a temperature of the reactor at a predetermined level, thus synthesizing a metal-carbon composite having the core-shell structure including the metal core and the carbon shell, the core-shell structure being supported on the oxide-based support having a carbon layer.

2. The method of claim 1, wherein (S1) further comprises performing surface treatment using N-doping or ozone after coating the surface of the oxide-based support with carbon.

3. The method of claim 1, wherein the oxide-based support comprises one or more selected from the group consisting of alumina, silica, titania, zirconia, zeolite and MCM-41.

4. The method of claim 1, wherein coating the surface of the oxide-based support with carbon in (S1) is performed at 400~1000° C.

5. The method of claim 1, wherein coating the surface of the oxide-based support with carbon in (S1) is performed using one or more selected from the group consisting of methane, acetylene, methanol, ethanol, acetone, benzene, toluene and xylene.

6. The method of claim 1, wherein the platinum (Pt) precursor is selected from the group consisting of (trimethyl) methylcyclopentadienyl platinum, platinum(II) acetylacetonate, tetrakis(trifluorophosphine) platinum(0), tetrakis(triphenylphosphine) platinum(0), platinum(II) hexafluoroacetylacetonate, trimethyl (methylcyclopentadienyl) platinum(I) and (1,5-cyclooctadiene) dimethylplatinum(II), the palladium (Pd) precursor is palladium(II) acetate, hexafluoroacetylacetonate palladium(II), or palladium(II) acetylacetonate, the ruthenium (Ru) precursor is ruthenium acetylacetonate, bis(ethylcyclopentadienyl) ruthenium(II), bis(cyclopentadienyl) ruthenium(II), or tris(2,2,6,6-tetramethyl-3,5-heptadionate) ruthenium(III), the nickel (Ni) precursor is nickel(II) acetylacetonate, bis-cyclopentadienyl nickel, or tetrakis trifluorophosphine nickel, the cobalt (Co) precursor is cobalt(II) acetylacetonate, dicarbonylcyclopentadienyl cobalt, cobalt carbonyl, or cyclopentadienyl dicarbonyl-cobalt(I), the molybdenum (Mo) precursor is molybdenum hexacarbonyl or molybdenum(V) chloride, and the gold (Au) precursor is methyl(triphenylphosphine)gold (I).

7. The method of claim 1, wherein the organic precursor for forming the carbon shell comprises one or more selected from the group consisting of methane, acetylene, methanol, ethanol, acetone, benzene, toluene and xylene.

8. The method of claim 1, wherein the carrier gas comprises one or more selected from the group consisting of oxygen, hydrogen, argon, helium and nitrogen gases.

9. The method of claim 1, wherein (S2) comprises maintaining a temperature approximate a boiling point of each of the vaporized precursors for maintaining precursor vaporization.

10. The method of claim 1, wherein in (S3), the reactor is heated to a temperature of 300° C. or more.

11. The method of claim 1, wherein in (S3), the reactor is heated to a temperature of 300~1800° C.

* * * * *